US011719825B2

(12) United States Patent
Steinmeyer et al.

(10) Patent No.: US 11,719,825 B2
(45) Date of Patent: Aug. 8, 2023

(54) METHOD AND DEVICE FOR DETERMINING A PARALLAX PROBLEM IN SENSOR DATA OF TWO SENSORS

(71) Applicant: VOLKSWAGEN AKTIENGESELLSCHAFT, Wolfsburg (DE)

(72) Inventors: Simon Steinmeyer, Braunschweig (DE); Thorsten Graf, Gifhorn (DE); Michael Schlichte, Braunschweig (DE)

(73) Assignee: Volkswagen Aktiengesellschaft

( * ) Notice: Subject to any disclaimer, the term of this patent is extended or adjusted under 35 U.S.C. 154(b) by 322 days.

(21) Appl. No.: 16/985,256

(22) Filed: Aug. 5, 2020

(65) Prior Publication Data

US 2021/0041235 A1  Feb. 11, 2021

(30) Foreign Application Priority Data

Aug. 9, 2019  (DE) .................. 10 2019 212 021.0

(51) Int. Cl.
*G06K 9/00* (2022.01)
*G01S 17/931* (2020.01)
(Continued)

(52) U.S. Cl.
CPC ........... *G01S 17/931* (2020.01); *G01C 3/085* (2013.01); *G01S 17/894* (2020.01); *G06F 18/22* (2023.01);
(Continued)

(58) Field of Classification Search
CPC .......... G06T 7/521; G06T 2207/10028; G06T 2207/30252
See application file for complete search history.

(56) References Cited

U.S. PATENT DOCUMENTS 5,625,408 A * 4/1997 Matsugu ............. H04N 13/243
  348/42
2009/0122161 A1* 5/2009 Bolkhovitinov ..... G09B 21/006
  348/222.1
(Continued)

FOREIGN PATENT DOCUMENTS

CN  107869989 A * 4/2018 .......... G01C 21/165
CN  108205658 A * 6/2018
(Continued)

OTHER PUBLICATIONS

Real-time stereo processing, obstacle detection and—cameras, R. Mandelbaum et al., IEEE, 1998, pp. 288-289 (Year: 1998).*
(Continued)

*Primary Examiner* — Jayesh A Patel
(74) *Attorney, Agent, or Firm* — Barnes & Thornburg, LLP

(57) ABSTRACT

A method for detecting a parallax problem in sensor data from two sensors, wherein the sensors are spaced apart at different positions and at least partly capture the same environment, and one of the sensors provides distance information items. The method includes receiving the acquired sensor data from the sensors; receiving or estimating sensor visual range information items from the other of the sensors; assigning measured values in the acquired sensor data of the one sensor to measured values corresponding to each of them from the other sensor, the assignment taking into account respective imaging conditions; comparing the distance information items and the received or estimated sensor visual range information items on each of the measured values of the sensor data, wherein a parallax problem is detected in response to a distance exceeding a threshold criterion; and outputting a comparison result.

10 Claims, 2 Drawing Sheets

(51) Int. Cl.

| | | |
|---|---|---|
| *G01C 3/08* | (2006.01) | |
| *G01S 17/894* | (2020.01) | |
| *G06T 7/521* | (2017.01) | |
| *G06F 18/22* | (2023.01) | |
| *G06V 10/80* | (2022.01) | |
| *G06V 10/98* | (2022.01) | |
| *G06V 20/56* | (2022.01) | |

(52) U.S. Cl.
CPC ............ *G06T 7/521* (2017.01); *G06V 10/803* (2022.01); *G06V 10/98* (2022.01); *G06V 20/56* (2022.01); *G06T 2207/10028* (2013.01); *G06T 2207/30252* (2013.01)

(56) References Cited

U.S. PATENT DOCUMENTS

| | | | |
|---|---|---|---|
| 2012/0236125 A1* | 9/2012 | Umezawa | G01B 11/026 348/47 |
| 2015/0235093 A1* | 8/2015 | Shima | G06T 7/254 382/103 |
| 2016/0005180 A1* | 1/2016 | Matono | G06T 7/593 348/47 |
| 2018/0329066 A1* | 11/2018 | Pacala | H04N 23/73 |
| 2019/0102898 A1* | 4/2019 | Tanabe | H04N 13/128 |
| 2019/0102901 A1* | 4/2019 | Terada | G06T 7/593 |
| 2019/0120955 A1* | 4/2019 | Zhong | G01S 13/584 |
| 2020/0103918 A1* | 4/2020 | Lee | G01C 21/3438 |

FOREIGN PATENT DOCUMENTS

| | | | |
|---|---|---|---|
| CN | 109074476 A * | 12/2018 | ........... B64C 39/024 |
| DE | 102006060893 A1 * | 11/2007 | ......... G06K 9/00805 |
| DE | 102010009620 A1 * | 9/2011 | ......... G06K 9/00805 |
| DE | 102013206707 A1 | 10/2014 | |
| DE | 102015201747 A1 | 8/2016 | |
| EP | 2113437 A2 * | 11/2009 | ......... B62D 15/0265 |
| EP | 3416134 A1 | 12/2018 | |
| WO | 2015129907 A1 | 9/2015 | |

OTHER PUBLICATIONS

Inter-vehicle Distance Detection—Images, Yoshihiro Shima, IEEE, 2017, pp. 1-6 (Year: 2017).*
Distance Measurement System Based on Binocular Stereo Vision, Zhengzhen Liu et al., IEEE, 2009, pp. 456-459 (Year: 2009).*
Distance Measurement System Using Binocular Stereo Vision Approach, Dhaval Patel et al, IJERT, 2013, pp. 2461-2464 (Year: 2013).*
Quantification of parallax in dual-sensor system, Sean Moore, SPIE, 2004, pp. 195-203 (Year: 2004).*
Detection of close Cut-In and Overtaking Vehicles for Driver Assistance based on Planar Parallax, Dietrich Bachring et al., IEEE, 2005, pp. 290-295 (Year: 2005).*

* cited by examiner

METHOD AND DEVICE FOR DETERMINING A PARALLAX PROBLEM IN SENSOR DATA OF TWO SENSORS

PRIORITY CLAIM

This patent application claims priority to German Patent Application No. 10 2019 212 021.0, filed 9 Aug. 2019, the disclosure of which is incorporated herein by reference in its entirety.

SUMMARY

Illustrative embodiments relate to a method and an apparatus for detecting a parallax problem in sensor data from two sensors. Illustrative embodiment also relate to a transportation vehicle.

BRIEF DESCRIPTION OF THE DRAWINGS

Disclosed embodiments are described in greater detail with reference to the figures. In the drawings.

DETAILED DESCRIPTION

Figure 1:
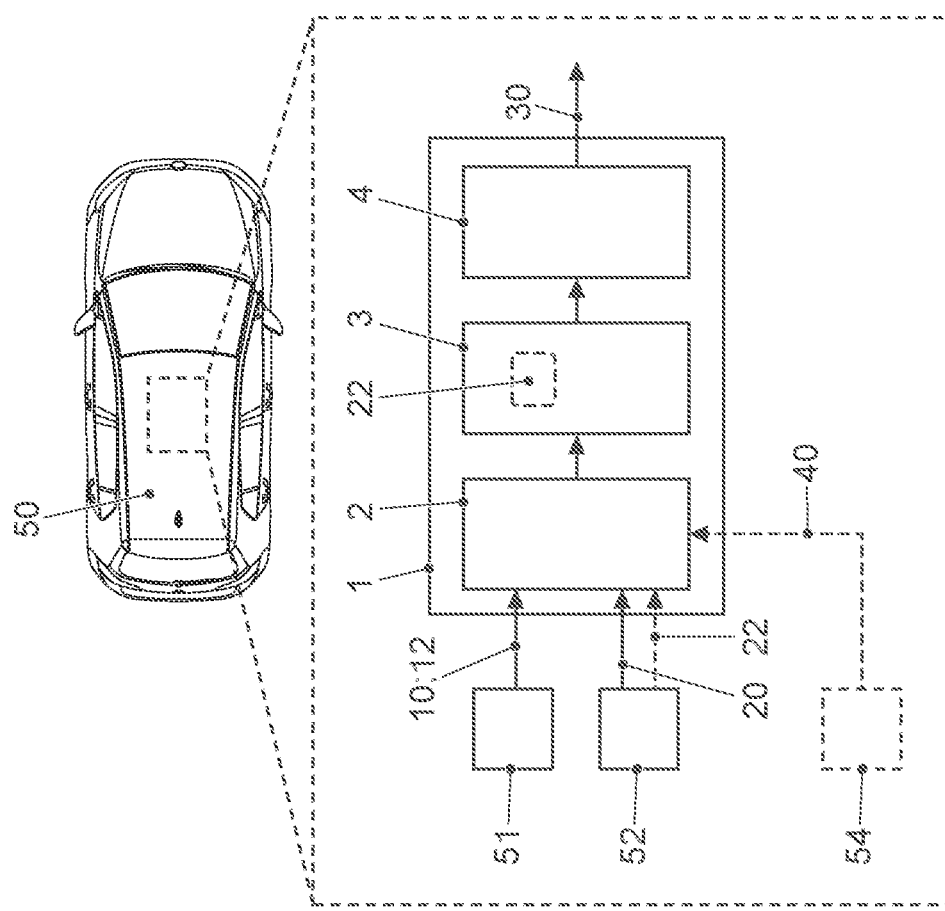
FIG. 1 shows a schematic representation of an exemplary embodiment of the apparatus for detecting a parallax problem in sensor data from two sensors.

Modern transportation vehicles have a plurality of assistance systems that can assist a driver in driving the transportation vehicle, or can drive the transportation vehicle automatically or semi-automatically. To do so, the assistance systems require information about an environment of the transportation vehicle. This information is collected by sensors and made available as sensor data. The sensors usually work on the basis of different measuring principles. For example, sensors may include a camera and a laser scanner or Light Detection and Ranging (LIDAR) sensor providing distance information items, or a radar sensor with elevation detection.

As a rule, the sensors are arranged at different positions on or in the transportation vehicle. As a result, the individual sensors capture the environment of the transportation vehicle from different perspectives. In a subsequent sensor data fusion process, this can cause a parallax problem, because sensor data from different sensors of an object acquired from different perspectives sometimes cannot be correctly associated with each other. The incorrect association of the sensor data can lead to an incorrect distance estimate.

Disclosed embodiments provide a method and an apparatus which can be used to detect a parallax problem in the sensor data from two sensors.

A method for detecting a parallax problem in sensor data from two sensors is provided, wherein the sensors are spaced apart from each other at different positions and at least partly capture the same environment, and one of the sensors provides distance information items, the method comprising: receiving the acquired sensor data from the sensors, receiving or estimating sensor visual range information items from the other of the sensors, assigning measured values in the acquired sensor data of the one sensor to measured values corresponding to each of them in the acquired sensor data from the other sensor, the assignment taking into account respective imaging conditions of the two sensors, comparing the distance information items and the received or estimated sensor visual range information items on each of the measured values of the sensor data, each of which is assigned to each other, a parallax problem being detected if a distance, determined on the basis of a distance measure, between a respective distance information item and a corresponding sensor visual range information item exceeds a threshold criterion, outputting a comparison result.

Furthermore, an apparatus is created for detecting a parallax problem in sensor data from two sensors, the sensors being arranged in positions that are spaced apart from each other and at least partially capturing the same environment, and one of the sensors providing distance information items, the apparatus comprising an input device, a computing device, and an output device, wherein the input device is designed to receive sensor data acquired from the sensors, wherein the computing device is designed to received sensor visual range information items from the other of the sensors or to estimate the sensor visual range information items of the other sensor on the basis of the acquired sensor data from the other sensor, to assign measured values in the acquired sensor data of the one sensor to corresponding measured values in the acquired sensor data from the other sensor, the assignment taking into account respective imaging conditions of the two sensors, to compare the distance information items and the received or estimated sensor visual range information items on each of the measured values of the sensor data, each of which is assigned to each other, and to detect a parallax problem if a distance determined on the basis of a distance measure between a respective distance information item and a corresponding sensor visual range information item exceeds a threshold criterion, and wherein the output device is designed to output a comparison result.

The method and the apparatus enable a parallax problem to be detected in sensor data collected from two sensors, which at least partially capture the same environment but are located at different installation positions. This is achieved by assigning individual measured values in the sensor data of the sensors to each other, the process taking into account the respective imaging conditions of the respective sensors. A comparison of distance information items provided by one sensor with sensor visual range information items received or estimated for the other sensor on the measured values respectively assigned to each other is used to check whether a parallax problem exists. It is assumed that a parallax problem exists for mutually assigned measured values if a distance, determined on the basis of a distance measure, between a respective distance information item and a corresponding sensor visual range information item exceeds a threshold criterion. In the simplest case, the distance measure used is a Euclidean distance. However, other distance measures can also be used, such as a Mahalanobis distance, in which, for example, the measurement inaccuracy of the sensors can be taken into account. For example, a threshold criterion can be implemented as a simple threshold and can range from one or a few centimeters to a few tens of centimeters. A comparison result received from the comparison of the individual measured values is then output.

The benefits of the described method and the apparatus are that they are simple to implement and only require a small amount of computing power.

The imaging conditions include the conditions under which the sensor data are acquired by the sensors in each case, such as an optical imaging, an opening angle, a detection range and/or a detection time. By taking into account the respective imaging conditions, it is possible to assign the sensor data of the sensors to each other.

The one sensor is a laser scanner or LIDAR sensor, a radar sensor with elevation measurement, or a stereo camera. The other sensor can be a camera, for example. The distance information item is information about how far away a measured value of the sensor data is from the sensor.

The sensor visual range information items include information about how far away a measured value in the sensor data of the other sensor is from the other sensor. It may be provided that no distance information item of the measured value is provided, but only an estimate in relation to a minimum distance. For example, based on the sensor data and the imaging conditions of the other sensor, it can be estimated that a measured value has a minimum distance of 10 meters from the other sensor. The sensor visual range information items are estimated on the basis of features in the acquired sensor data. For this purpose, a feature recognition is carried out by the computing device, for example, with the aid of known methods from computer vision and machine learning. For example, a road ahead can be detected from a detected texture in a captured camera image. If the texture of the road (e.g., asphalt and parallel lane markings) continues in the direction of a horizontal line detected in the camera image without interruption or without other objects arranged in front of it, it can be assumed that there is a free zone in the region of the detected road, up to which the camera can capture the environment. In addition, an optical flow can also be used to determine the sensor visual range information items. A sensor visual range can also be determined from detected objects, of which an absolute object size is known. With the aid of known imaging conditions for the other sensor, a distance to the object can then be calculated and/or estimated from the absolute object size and from this, the sensor visual range information items for the associated measured values can be calculated or estimated.

It is provided that the sensor data of the one sensor and the other sensor are synchronized, so that the sensor data are already correctly associated with each other temporally. This means that the sensor data are consistent with each other in relation to a time base. In principle, such a synchronization can be carried out in advance by various methods. Objects can be tracked in the image space of the sensor data by optical flow and matching of three-dimensional image points in the image space (object tracking). In addition, objects can be tracked in the sensor data of the at least one sensor providing the distance information items. Based on this object tracking, a time corresponding to associated sensor data can be estimated in the sensor data of the other sensor. Furthermore, the sensor data of the sensors can be acquired synchronously, for example, by using a common trigger signal.

It may be provided that the sensor data are interpolated to allow the sensor data to be assigned to each other.

It may be necessary to reach a minimum number of readings for which the specified distance exceeds the threshold criteria to detect a parallax problem. This allows incorrect or random deviations in individual measured values due to erroneous or noisy sensor data to be taken into account.

The measured values are measuring points. However, it may also be provided that the measured values are features derived from the sensor data, such as edge points in a captured camera image, which are determined from a larger area of the camera image.

Parts of the apparatus, in particular, the computing device, may be formed individually or collectively as a combination of hardware and software, for example, as program code which is executed on a microcontroller or microprocessor.

In at least one exemplary embodiment, it is provided that the assignment of the measured values is carried out by back projection of the measured values of the sensor data of the one sensor into an image space formed from the measured values of the sensor data of the other sensor. This makes it particularly simple and quick to check if a parallax problem is present. For example, if the one sensor is a LIDAR sensor and the other sensor is a camera, the measured values of the sensor data of the LIDAR sensor are projected into the associated camera image, in other words individual measured values of the sensor data of the LIDAR sensor are assigned to individual measured values or image elements in the camera image according to the respective imaging conditions.

In at least one exemplary embodiment, it is provided that the sensor visual range information items are estimated at least partly on the basis of estimated free zones, wherein a pattern recognition is carried out on the sensor data of the other sensor to estimate the free zones. In this context, a free zone refers to a region in front of the other sensor, in particular, a camera, which is free of objects at least up to a specified distance. This allows the sensor visual range information items to be estimated simply and with little computational effort. For example, this allows sensor visual range information items to be generated for each of the individual measured values by defining the sensor visual range information items for each measured value as a minimum distance up to which the other sensor can at least capture the environment and/or has a direct line of sight. Another benefit is that cameras already exist which generate and provide estimates of free zones in the environment based on the environment detection and interpretation performed on the acquired camera data. Based on this estimation provided by the camera, the sensor visual range information items can then be estimated.

In at least one exemplary embodiment, it is provided that an object recognition is carried out within the context of the pattern recognition and the free zones are estimated on the basis of objects recognized in the environment. It is provided that objects are detected in the environment, object positions are estimated in the environment, and the free zones are defined as the regions that do not include object positions. This allows the free zones to be estimated in a way that is particularly simple to implement and requires little computational effort. For moving objects, this allows a simplified estimation of the free zones, since the objects can be easily tracked between adjacent time operations by object tracking.

In at least one exemplary embodiment, it is provided that the sensor visual range information items of the other sensor are estimated on the basis of sensor data of at least one other sensor. The at least one other sensor can also be a laser scanner or LIDAR sensor, for example, but located closer to the other sensor. For example, this can be smaller and have a low resolution capability. Based on the additional sensor data collected by the additional sensor, the sensor visual range information item is estimated. In this case, it may also be provided that a common sensor visual range information item is estimated for multiple adjacent measured values of the sensor data of the other sensor, if the resolution allows.

Additional features for the design of the apparatus are obtained from the description of disclosed embodiments of the method. The benefits of the apparatus are the same as those of the exemplary embodiments of the method.

A transportation vehicle is also provided comprising two sensors, wherein the sensors are arranged at different positions spaced apart from each other and at least partly capture the same environment, and wherein one of the sensors provides distance information items, and an apparatus according to any one of the embodiments described.

In at least one exemplary embodiment of the transportation vehicle, it is provided that the one sensor is a LIDAR sensor or a 3D radar sensor and the other sensor is a camera.

FIG. 1 shows a schematic representation of an exemplary embodiment of the apparatus 1 for detecting a parallax problem in sensor data 10, 20 from two sensors 51, 52. The apparatus 1 and the sensors 51, 52 are arranged in a transportation vehicle 50. The apparatus 1 comprises an input device 2, a computing device 3 and an output device 4.

The sensors 51, 52 are spaced apart at different positions and at least partially detect the same environment. For example, the sensor 51 is a laser scanner or a LIDAR sensor that provides sensor data 10 as three-dimensional reflection points, each having one distance information item 12. For example, the sensor 52 is a camera that provides sensor data 20 as camera images. The sensors 51, 52 detect the environment 60 shown in FIG. 2, for example.

The input device 2 receives the sensor data 10, 20 acquired by the sensors 51, 52 and synchronizes these data, in particular, on a common time base.

The computing device 3 assigns measured values in the acquired sensor data 10 of the sensor 51 to corresponding measured values in the acquired sensor data 20 of the other sensor 52. The assignment takes into account the imaging conditions of the two sensors 51, 52. In simple terms, this means that a sight-ray examination is carried out, in which on the basis of the detection directions from which the individual measured values are acquired at an opening angle of the respective sensor 51, 52, the measured values are assigned on the basis of mutually corresponding sight rays or detection directions. The aim is that the mutually assigned measured values each represent the same region in the environment.

It is provided that the assignment of the measured values is carried out by back projection of the measured values of the sensor data 10 of the one sensor 51 into an image space formed from the measured values of the sensor data 20 of the other sensor 52. If the other sensor 52 is a camera, the measured values of the sensor data 10 of the one sensor 51 are projected into a camera image generated from the sensor data 20 of the camera, taking into account the respective imaging conditions of one sensor 51 and the camera.

The computing device 2 also receives sensor visual range information items 22 from the other sensor 51 or estimates the sensor visual range information items 22 based on the acquired sensor data 20 from the other sensor 51.

Then the computing device 2 compares the distance information items 12 and the received or estimated sensor visual range information items 22 on measured values of the sensor data 10, 20 assigned to each other. Based on the comparison, the computing device 2 detects a parallax problem if a distance, determined on the basis of a distance measure, between a respective distance information item 12 and a corresponding sensor visual range information item 22 exceeds a threshold criterion. It may be necessary to achieve a minimum number of measurements for which the respective specified distance exceeds the threshold criterion to detect a parallax problem. This allows incorrect or random deviations in individual measured values due to faulty or noisy sensor data 10, 20 to be taken into account.

A comparison result 30 is then output by the output device 4, for example, as a digital data packet, which identifies the measured values in which the parallax problem occurred.

It may also be provided that the sensor visual range information items 22 are at least partly estimated on the basis of estimated free zones, wherein a pattern recognition is performed on the sensor data 20 of the other sensor 51 to estimate the free zones.

As an extension, it can be provided that an object recognition is carried out within the context of the pattern recognition and the free zones are estimated on the basis of objects recognized in the environment.

It may also be possible to estimate the sensor visual range information items 22 of the other sensor 52 based on sensor data 40 of at least one other sensor 54.

Figure 2:
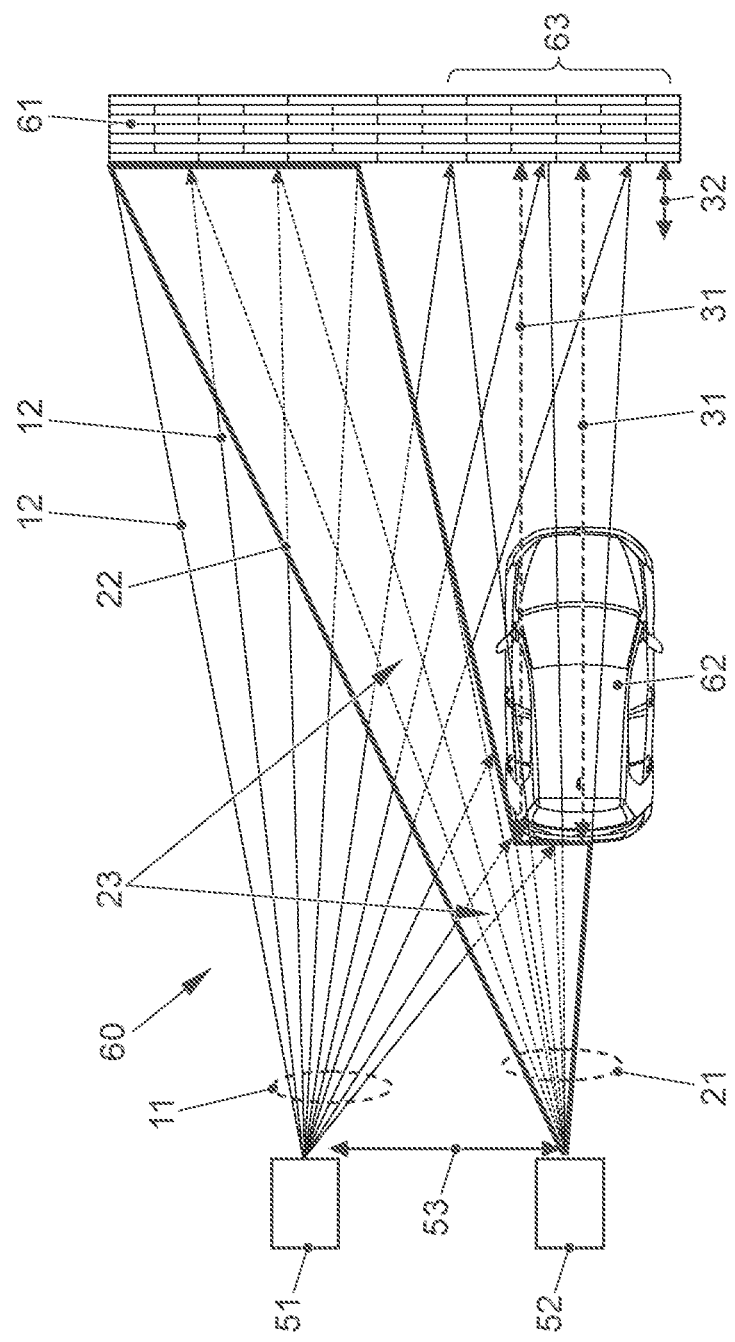
FIG. 2 shows a schematic representation to illustrate the method for detecting a parallax problem in sensor data from two sensors.

FIG. 2 shows a schematic illustration of the method for determining a parallax problem in sensor data from two sensors 51, 52. The sensors 51, 52 are a distance 53 apart from each other and capture an overlapping region of an environment 60. Sight rays 11, 21 of the sensors 51, 52 are also shown, wherein the sight rays 11, 21 correspond in each case with acquisition angles for individual measured values in the sensor data. In the example shown, sensor 51 is a LIDAR sensor that provides three-dimensional measurements with associated distance information items 12 of the environment 60 (for clarity, not all sight rays 11 are labeled with a reference sign for the distance information items 12). The other sensor 52 is a camera, which provides a camera image as sensor data.

In the environment 60 there is a flat wall 61 and an object 62, such as another transportation vehicle. Due to the distance 53, the sensors 51, 52 detect the object 62 from different directions. The sensor 51 detects the wall 61 in a region 63 past the object 62, while from the point of view of the sensor 52, that is to say the camera, the wall 61 is concealed by the object 62 in this region 63. A parallax problem therefore exists.

To detect the parallax problem, sensor visual range information items 22 are used. The information items are either generated and provided by the other sensor 52 or estimated by the computing device on the basis of features in the acquired sensor data. For example, a road ahead can be detected from a detected texture in a captured camera image. If the texture of the road (e.g., asphalt and parallel lane markings) continues in the direction of a horizontal line detected in the camera image without interruption or without other objects arranged in front of it, it can be assumed that there is a free zone in the region of the detected road. In addition, an optical flow can also be used to determine the sensor visual range information items 22. Sensor visual range information items 22 can also be determined from a detected object (e.g., another transportation vehicle of known type) for which an absolute object size is known. With the aid of known imaging conditions for the other sensor 52, a distance to the object and thereby associated sensor visual range information items 22 can then be calculated or estimated from the known absolute object size.

It may be provided that the sensor visual range information items 22 are estimated at least partly on the basis of estimated free zones 23, wherein a pattern recognition is carried out on the sensor data of the other sensor 52 to estimate the free zones 23.

As an extension it may be provided that an object recognition is carried out within the context of the pattern recognition and the free zones 23 are estimated on the basis of objects 61, 62 recognized in the environment 60. The free zones 23 are then determined by the regions where no objects were detected. This can be carried out, for example, by simply creating a negative masking, which is defined by the detected objects and includes all regions outside of the detected objects.

In the example shown, the sensor visual range information items 22 include an estimate of lines of sight of the camera for each of the measured values or image elements.

After the computing device has assigned the measured values in the acquired sensor data of the one sensor 51 to corresponding measured values in the acquired sensor data of the other sensor 52, taking into account the respective imaging conditions of the two sensors 51, 52, the computing device compares the distance information items and the received or estimated sensor visual range information items 22 on each of the measured values of the sensor data that are assigned to each other.

In the example shown in FIG. 2, distances 31 determined on the basis of a distance measure are obtained for the measured values (for the sake of clarity not shown for each measured value/sight ray 11), which are located in the region 63. These distances 31 are compared to a threshold criterion 32, which is defined, for example, by a predefined threshold value, which in the example shown should correspond to 10% of the determined distances 31 for illustration purposes. Depending on the properties of the sensors 51, 52 used, the threshold value of the threshold criterion 32 is a few to a few tens of centimeters. For the measured values outside the region 63, by contrast, the distance information items and the sensor visual range information items 22 are the same.

Since the determined distances 31 of the measured values in the region 63 exceed the threshold value of the threshold criterion 32, the computing device detects a parallax problem and produces a corresponding comparison result, which is output by the output device.

LIST OF REFERENCE SIGNS

1 apparatus
2 input device
3 computing device
4 output device
10 sensor data
11 sight ray
12 distance information items
20 sensor data
21 sight ray
22 sensor visual range information items
23 free zone
30 comparison result
31 distance
32 threshold criterion
40 sensor data
50 transportation vehicle
51 sensor (LIDAR sensor)
52 sensor (camera)
53 distance
54 additional sensor
60 environment
61 wall
62 object
63 region

The invention claimed is:

1. An apparatus for detecting a parallax problem, the apparatus comprising:
a first sensor and a second sensor arranged in positions that are spaced apart from each other and at least partially capturing the same environment, the first sensor configured to provide distance information items;
an input device;
a computing device; and
an output device,
wherein the input device receives acquired sensor data from the first and second sensors, the acquired sensor data from the first sensor includes at least one first distance value for at least one first point in the environment based on the first sensor, the at least one first distance value measuring a distance from the first sensor to the at least one first point,
wherein the computing device:
one of (i) receives sensor visual range information items for the at least one first point from the second sensor or (ii) estimates the sensor visual range information items for the at least one first point of the second sensor based on the acquired sensor data from the second sensor such that the computing device is configured to determine at least one second distance value for the at least one first point based on the second sensor, the at least one second distance value measuring a distance from the second sensor to the at least one first point or to at least one object located in the environment between the second sensor and the at least one first point;
assigns measured values, which include the at least one first distance value, in the acquired sensor data of the first sensor to corresponding measured values, which include the at least one second distance value, in the acquired sensor data from the second sensor such that the at least one first point in the environment is represented by at least the at least one first distance value as measured by the first sensor and the at least one second distance value as measured by the second sensor, the assignment taking into account respective imaging conditions of the two sensors;
compares the at least one first distance value to the at least one second distance value in order to determine a comparison distance measure indicative of a distance between a point on the at least one object at which the second sensor measures against and the at least one first point; and
determines whether a parallax problem exists in response to the comparison distance measure exceeding a threshold criterion value, and
wherein the output device outputs a comparison result of the comparison between the at least one first distance value and the at least one second distance value.

2. The apparatus of claim 1, wherein the computing device further carries out the assignment of the measured values by back projection of the measured values of the sensor data of the first sensor into an image space formed from the measured values of the sensor data of the second sensor.

3. The apparatus of claim 1, wherein the computing device is further designed that the sensor visual range information items are estimated based on estimated free zones and performs a pattern recognition on the sensor data of the second sensor to estimate the free zones.

4. A transportation vehicle comprising the apparatus of claim 1.

5. The transportation vehicle of claim 4, wherein the first sensor is a LIDAR sensor or a 3D radar sensor and the second sensor is a camera.

6. A method for detecting a parallax problem in sensor data from a first sensor and a second sensor, wherein the first and second sensors are spaced apart at different positions and at least partly capture the same environment, the first sensor configured to provide distance information items, the method comprising:

receiving the acquired sensor data from the first and second sensors, the acquired sensor data from the first sensor includes at least one first distance value for at least one first point in the environment based on the first sensor, the at least one first distance value measuring a distance from the first sensor to the at least one first point;

receiving or estimating visual range information items for the at least one first point from the second sensor based on sensor data acquired from the second sensor such that the computing device is configured to determine at least one second distance value for the at least one first point based on the second sensor, the at least one second distance value measuring a distance from the second sensor to the at least one first point or to at least one object located in the environment between the second sensor and the at least one first point;

assigning measured values, which include the at least one first distance value, in the acquired sensor data of the first sensor to corresponding measured values, which include the at least one second distance value in the acquired sensor data of the second sensor such that the at least one first point in the environment is represented by at least the at least one first distance value as measured by the first sensor and the at least one second distance value as measured by the second sensor, the assignment taking into account the respective imaging conditions of the two sensors;

comparing the at least one first distance value to the at least one second distance value in order to determine a comparison distance measure indicative of a distance between a point on the at least one object at which the second sensor measures against and the at least one first point;

determining whether a parallax problem exists in response to the comparison distance measure exceeding a threshold criterion value; and outputting a comparison result of the comparison between the at least one first distance value and the at least one second distance value.

7. The method of claim 6, wherein the assignment of the measured values is carried out by back projection of the measured values of the sensor data of the first sensor into an image space formed from the measured values of the sensor data of the second sensor.

8. The method of claim 6, wherein the sensor visual range information items are estimated at least partly based on estimated free zones, wherein a pattern recognition is carried out on the sensor data of the second sensor to estimate the free zones.

9. The method of claim 8, wherein an object recognition is carried out within the context of the pattern recognition and the free zones are estimated based on the at least one object recognized in the environment.

10. The method of claim 6, wherein the sensor visual range information items of the second sensor are estimated based on sensor data of at least one other sensor.

* * * * *